March 23, 1954

C. D. RICE 2,672,829

MACHINE FOR PREPARING DOUGH FOR THE
MANUFACTURE OF FILLED BAKERY GOODS

Filed March 1, 1949

INVENTOR.
Curtis D. Rice

BY
Wheeler, Wheeler & Wheeler
ATTORNEYS

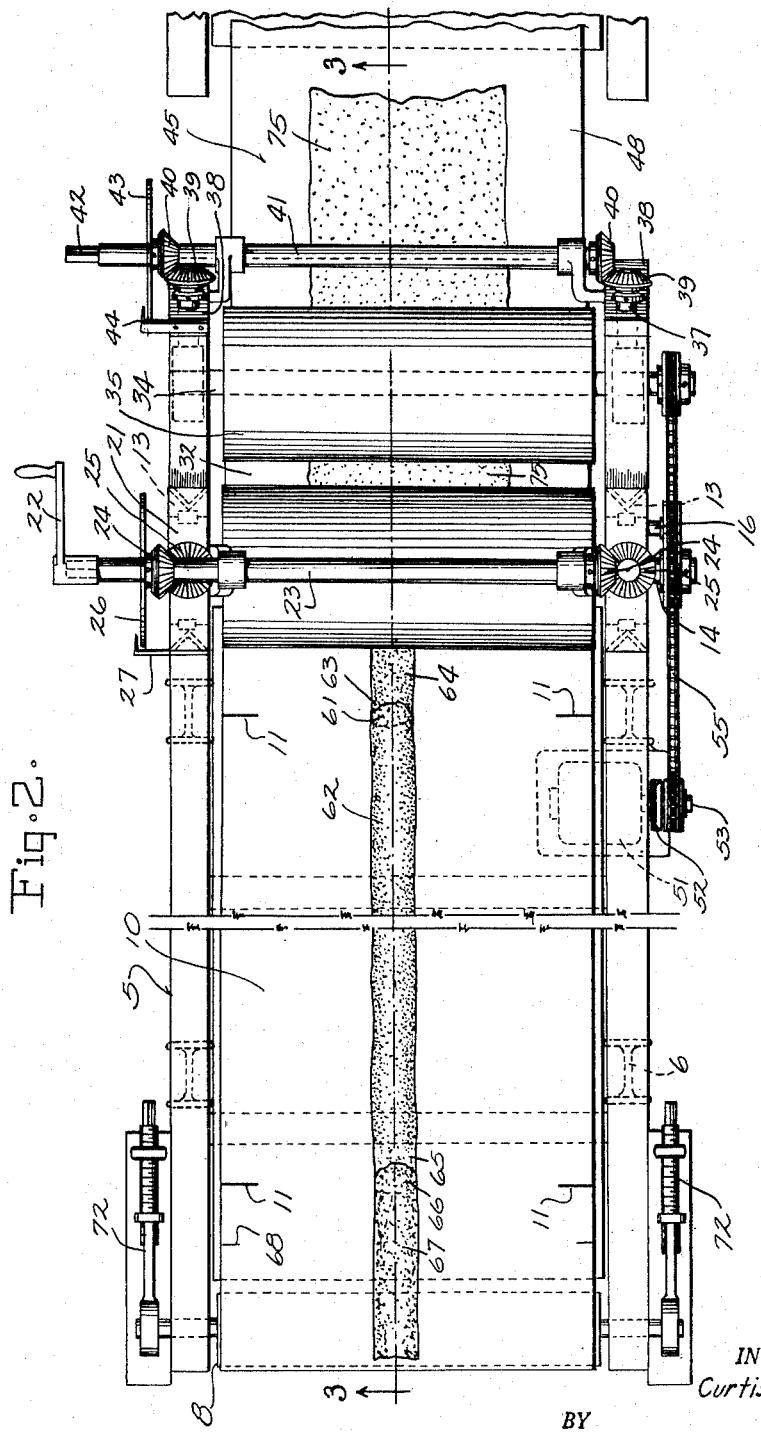

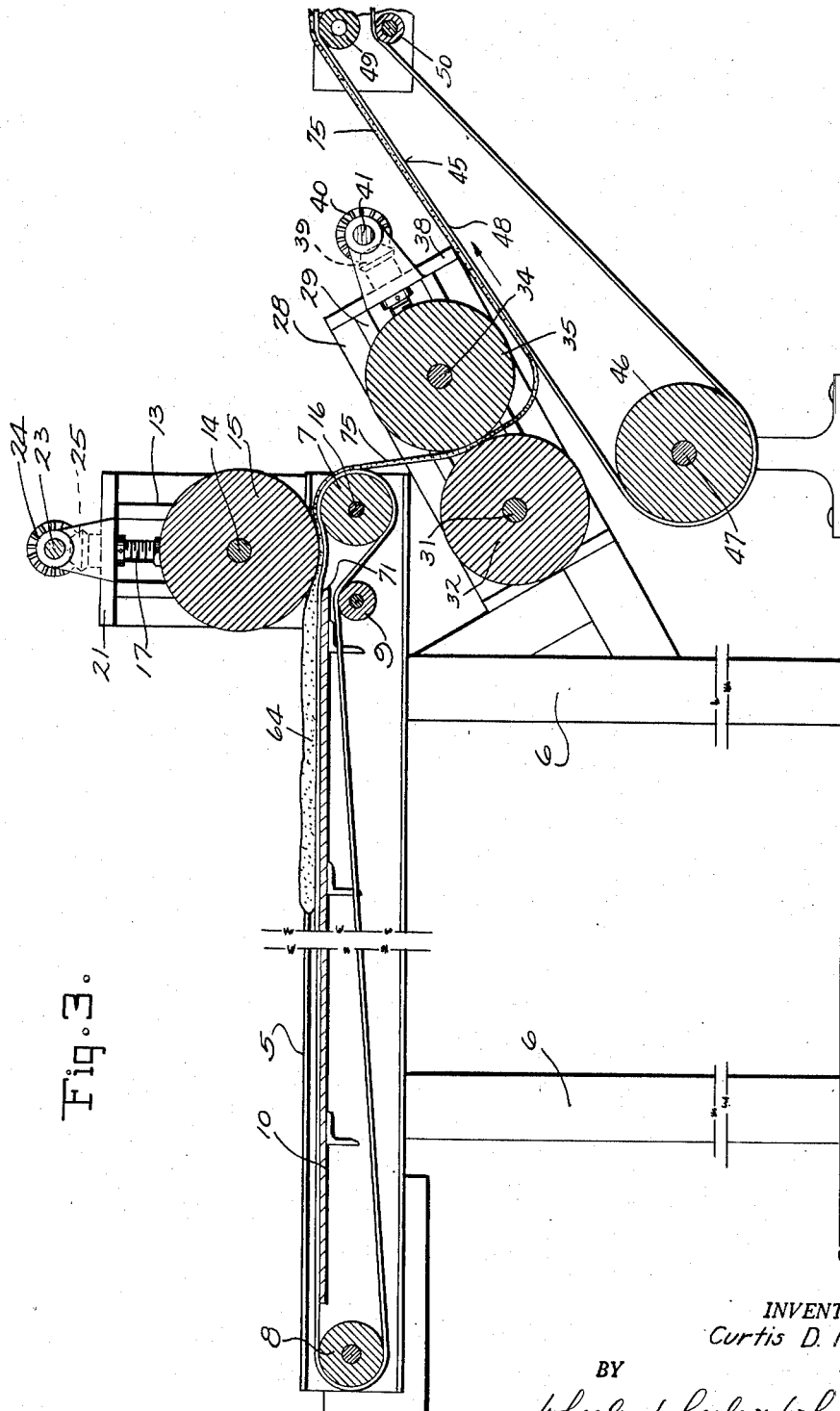

Patented Mar. 23, 1954

2,672,829

UNITED STATES PATENT OFFICE 2,672,829

MACHINE FOR PREPARING DOUGH FOR THE MANUFACTURE OF FILLED BAKERY GOODS

Curtis D. Rice, Kalamazoo, Mich.

Application March 1, 1949, Serial No. 78,947

4 Claims. (Cl. 107—12)

This invention relates to a machine for preparing dough for the manufacture of filled bakery goods.

It is a primary object of the invention to save the hand labor heretofore required for stretching dough and flattening it. Various doughs require different lengths of stretching. Consequently, it is a more specific object of the invention to provide means whereby the worker will know exactly the extent to which the dough should be stretched in its initial application on the machine, the machine automatically controlling the stretch of the dough thereafter.

It is the further object of the invention to provide for the spreading of the dough in the form of a wide ribbon, while preventing it from balling up at the point where it enters the bight of the spreading rolls.

Dough has considerable resilience, and if engaged by rolls on fixed centers, it tends to form a ball. By incorporating a yielding movement between the parts required in the initial spreading of the dough, and by thereafter subjecting the dough to tension in conjunction with further levelling action, it is possible to eliminate the balling-up and still produce a ribbon of substantially uniform width and thickness.

This application is a companion to my copending applications Serial No. 78,946, now Patent No. 2,629,341, and Serial No. 78,948, now Patent No. 2,619,051, filed of even date herewith.

In the drawings:

Fig. 2 is a plan view of the apparatus shown in Fig. 1.

Fig. 3 is a view of the device in longitudinal section.

Figure 1:
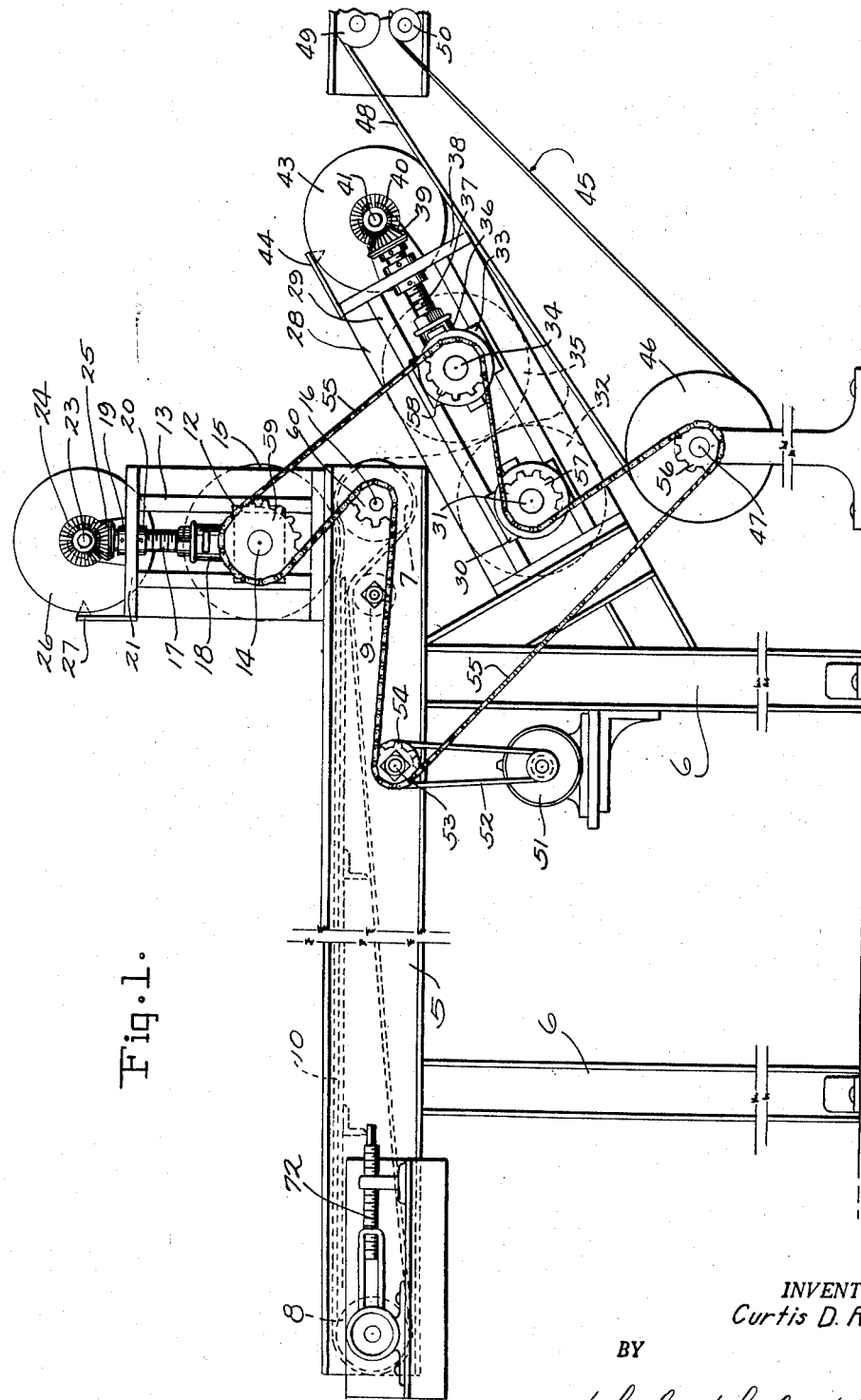
Fig. 1 is a view in side elevation of a machine embodying my invention.

On a suitable frame 5, supported by legs 6, I mount pulleys or guides 7, 8 and 9 for a conveyor belt 10. As clearly shown in Fig. 2, the conveyor is calibrated with any suitable number of graduations 11.

Mounted in bearing blocks 12 for vertical adjustment in ways 13 is a shaft 14 supporting a roll 15 which is offset rearwardly from the shaft 16 on which roll 7 is mounted. The bearing blocks 12 are positioned by screws 17 engaged in nuts 18 and anchored by collars 19 and 20 against axial replacement respecting a bridge 21 at the top of each of the ways 13. The screws are adjusted in unison by means of any suitable crank 22 applied to the squared end of a cross shaft 23 which has bevelled pinions 24 meshing with bevel gears 25 at the top ends of the respective screws. Any other adjustment would suffice. For indicating, for reference purposes, the particular position of the roll 15, I prefer to supply the cross shaft 23 with a dial 26 cooperating with a fixed pointer at 27.

Preferably carried at an oblique angle below the main frame 5 is a sub-frame 28 providing ways at 29 at each side of the machine. Bearing blocks 30, fixed in the ways 29, support the shaft 31 for rolls 32. Also supported by ways 29 are the adjustable bearing blocks 33 for the shaft 34 of roll 35. The adjustable bearing blocks are adjusted and positioned in the same manner as the blocks 12 above described, each of the blocks 33 having a nut 36 engaged by a screw 37 which is fixed respecting the bridge member 38. The respective screws 37 are provided with gears 39 with which mesh the pinions 40 on the adjusting shaft 41 which has a squared end at 42 to receive the crank 22 and is desirably provided with an indicator dial at 43 with which the pointer 44 cooperates to show, for purposes of reference, the specific position of the adjustable shaft 34 and the roll 35 carried thereby.

Beneath the rolls 32 and 35 is a conveyor belt 45 which passes about the lower pulley 46 on shaft 47 and thence has an upwardly inclined run 48 leading to the upper pulley 49. From a horizontal run indicated, but not shown in full, in Fig. 3, the belt returns to pulley 46 over an idler at 50.

The entire apparatus may conveniently be driven from a motor 51 which, by means of belt 52, drives a jack shaft 53. This shaft is provided with a driving sprocket at 54 for a chain 55. The chain passes downwardly to a sprocket 56 on shaft 47 to operate the belt 45, and thence passes upwardly and about a sprocket 57 on shaft 31 to operate roller 32, and thence about a sprocket 58 on shaft 34 to operate roller 35, and thence about a sprocket 59 on shaft 14 to operate roller 15, and thence about a sprocket 60 on shaft 16 to operate a pulley 7. From sprocket 60 the chain returns to the driving sprocket 54.

As indicated by the breaks in the various views of the machine, the table 5 and the assembly belt 10 may be of any suitable length. The conveyor 10 serves as a table upon which the various lengths or "ropes" of dough are stretched and assembled.

The attendant first takes a given mass of dough which, for example, may weigh ten and three-fourths pounds, and may be about eight inches in diameter, and twenty-six inches long, as received by him. He catches a portion of this dough between the roller 15 and belt 5 at a time when one of the gauge marks 11 is just passing beneath the roller. With one end of the dough thus anchored, he pulls on the other end until he stretches the dough into a rope about eighty-six inches in length, this figure being given by way of example. The selected length is desirably indicated by another gauge mark 11 on the belt. Thus, the stretching may be done while the belt is in continuous operation. Thereafter, he will stretch his next successive piece of dough by slightly lapping it upon the rope of dough previously stretched, this being clearly indicated in Fig. 2, where the end 61 of the dough rope 62 laps the end 63 of the next preceding dough rope 64, the trailing end 65 of dough rope 62 being lapped by the leading end 66 of dough rope 67. In each instance, the adhesion of the dough to the previous rope and to the conveyor is sufficient to permit each successive rope to be stretched to a length indicated by the respective marker 11 on the belt. Where the operations of the bakery require the use of different types of dough, requiring a different length of stretch, the belt may bear several series of calibrations so that there is one set of calibrations for each type of dough, this being indicated by the calibrations 68 in Fig. 2.

If the roll 7 were directly beneath the roll 15, to require the dough to pass between fixed centers, the dough, instead of being flattened, would be caused to form a ball at the point of entering between the rolls. Since the rolls are offset, there is first a yielding pressure applied toward roll 15 by the belt 10 as clearly shown in Fig. 3, after which final pressure is applied where the belt and the dough passes together between rolls 15 and 7. The belt is supported upon a table surface 70 throughout most of the length of frame 5, but the table surface terminates at 71 to permit the belt to pass circumferentially for at least a few degrees of peripheral movement around the roll 15. The required tension of the belt is maintained by a tightener 72 (Fig. 1).

Although the rolls 32 and 35 are fairly comparable in size to roll 15, their respective driving sprockets 57 and 58 are slightly smaller in diameter than the sprocket 59, in relation to the respective diameters of the rolls. As a result, the peripheral speed of rolls 32, 35 is slightly greater than the rate of lineal travel of the belt 10 from which the compressed ribbon 75 is delivered from the belt as the belt passes about the pulley 7. In consequence, the ribbon of dough at 75 is constantly being attenuated or stretched by the rolls 32 and 35, which leave the ribbon of approximately uniform width and uniform thickness as it is discharged onto the belt 45.

While subsequent operations on the dough have no direct relation to the present invention, it may be noted that on the belt 45, the dough is provided with a strip of filling and is subsequently cut into lengths and folded over the filling for baking.

In consequence of the present invention, the baked product has great uniformity, being assured of uniform consistency, texture, thickness, and width, without requiring the technical skill or manual labor heretofore necessary. Assuming the original eighty-six inch length of the rope, as in the example above stated, the machine stretches and flattens the rope to have a total length of about one hundred and twelve inches, and a width of eight inches, and a thickness of three-sixteenths of an inch.

I claim:

1. In a dough-preparing machine, the combination with a conveyor and supporting guides including a conveyor tensioning means, said conveyor having between said guides an upwardly exposed run constituting a movable assembly table, a support for an intermediate portion of said conveyor run, the support terminating short of a guide toward which the conveyor run moves during conveyor operation, means for actuating the conveyor, and a compression roll coacting with the conveyor and disposed above the conveyor and between the support and the guide last mentioned with its periphery at least as low as said last mentioned guide to act on dough carried by the conveyor run aforesaid at the point where such run is unsupported between the said support and the conveyor guide toward which said run operates.

2. The device of claim 1 in which the conveyor is provided with indicia for indicating the extent to which an operator should stretch ropes of dough in applying them to the conveyor.

3. The device of claim 1 in which the level of the support and guide is such respecting said roll that with dough on the conveyor said conveyor passes angularly about said roll before passing about the guide toward which said run operates, the conveyor being resiliently yieldable from said roll in passing thereabout and having a fixed spacing from said roll in passing about the conveyor guide toward which said run operates.

4. A dough-preparing machine comprising the combination with a machine frame provided with pulleys, of a conveyor belt operating over the pulleys and having a dough-receiving portion, means for adjusting one of the pulleys for the tightening of the belt, a roller provided with suitable bearings supporting it above the path of travel of said belt and adjacent one of the pulleys and offset therefrom, the belt and interposed dough passing angularly about the roller en route to the pulley last mentioned, means for adjusting the bearings for varying the position of the roller respecting the belt, and means spaced from the pulley last mentioned for supporting the belt en route to the roller, together with means for driving the belt in a direction to advance a run thereof over said supporting means and beneath the roller and about the pulley last mentioned, the belt being unsupported between the supporting means and the last mentioned pulley and having a dough-receiving portion.

CURTIS D. RICE.

References Cited in the file of this patent

UNITED STATES PATENTS

| Number | Name | Date |
|---|---|---|
| Re. 22,835 | Foard | Jan. 28, 1947 |
| 266,127 | Franciscus | Oct. 17, 1882 |
| 347,790 | Gent | Aug. 24, 1886 |
| 402,396 | Bryce et al. | Apr. 30, 1889 |
| 777,349 | Mitchell | Dec. 13, 1904 |
| 829,270 | Harton | Aug. 21, 1906 |
| 1,026,755 | Lundin | May 21, 1912 |
| 1,134,970 | Lawrence | Apr. 6, 1915 |
| 1,945,755 | Scruggs, Jr. | Feb. 6, 1934 |
| 2,289,388 | Stiles | July 14, 1942 |
| 2,321,134 | Fleisher et al. | June 8, 1943 |
| 2,357,085 | Cohen et al. | Aug. 29, 1944 |
| 2,402,420 | LeSage | June 18, 1946 |
| 2,431,074 | Palmer | Nov. 18, 1947 |
| 2,521,982 | Kors | Sept. 12, 1950 |

FOREIGN PATENTS

| Number | Country | Date |
|---|---|---|
| 440,699 | Germany | Feb. 14, 1927 |